United States Patent
Gean et al.

(10) Patent No.: US 10,671,341 B1
(45) Date of Patent: Jun. 2, 2020

(54) METHODS AND APPARATUS FOR LOW AUDIO FALLBACK FROM REMOTE DEVICES USING ASSOCIATED DEVICE SPEAKER

(71) Applicant: Motorola Solutions, Inc., Chicago, IL (US)

(72) Inventors: Nissim Gean, Netanya (IL); Haim Kahlon, Shoam (IL); Hadi Shvartz, Bat Hadar (IL); Felix Barmoav, Reshon Leziyyon (IL)

(73) Assignee: Motorola Solutions, Inc., Chicago, IL (US)

( * ) Notice: Subject to any disclaimer, the term of this patent is extended or adjusted under 35 U.S.C. 154(b) by 0 days.

(21) Appl. No.: 16/567,823

(22) Filed: Sep. 11, 2019

(51) Int. Cl.
| | |
|---|---|
| *H04R 3/04* | (2006.01) |
| *G06F 3/16* | (2006.01) |
| *H04R 29/00* | (2006.01) |
| *G10L 25/51* | (2013.01) |
| *H04R 1/08* | (2006.01) |
| *H02J 7/00* | (2006.01) |
| *H04R 1/02* | (2006.01) |

(52) U.S. Cl.
CPC .............. *G06F 3/165* (2013.01); *G10L 25/51* (2013.01); *H02J 7/0047* (2013.01); *H04R 1/025* (2013.01); *H04R 1/08* (2013.01); *H04R 3/04* (2013.01); *H04R 29/001* (2013.01); *H04R 2420/07* (2013.01); *H04R 2499/11* (2013.01)

(58) Field of Classification Search
CPC ......... H04B 15/00; G06F 3/165; G10L 25/51; H02J 7/0047; H04W 52/06; H04W 52/026; H04R 1/025; H04R 1/08; H04R 3/04; H04R 29/001; H03G 3/32
See application file for complete search history.

(56) References Cited

U.S. PATENT DOCUMENTS

| | | |
|---|---|---|
| 7,623,667 B2 | 11/2009 | Sander et al. |
| 2006/0025206 A1 | 2/2006 | Walker et al. |
| (Continued) | | |

FOREIGN PATENT DOCUMENTS

| | | |
|---|---|---|
| JP | 2018/026646 | 2/2018 |

OTHER PUBLICATIONS

U.S. Appl. No. 16/232,629, filed Dec. 26, 2018, entitled "Methods and Apparatus for Configuring Multiple Microphones in an Electronic Communication Device".

*Primary Examiner* — Thanh C Le
(74) *Attorney, Agent, or Firm* — Baker Botts L.L.P.

(57) ABSTRACT

Methods and apparatus for configuring a portable communication device are disclosed. The methods include receiving an incoming audio signal, adjusting the incoming signal audio level based on a volume control setting, generating an ultrasonic audio signal having an audio level independent of the volume control setting, mixing the incoming signal with the ultrasonic signal to generate a mixed audio signal, outputting the mixed signal to a remote audio device, receiving a remote audio signal from the remote device, and comparing the remote signal audio level to one or more thresholds to determine whether to output a compensated audio signal to a speaker. The remote signal may be detected by the remote device in response to sound output from the remote device based on the mixed signal, and the compensated signal audio signal may be adjusted based on an estimated loss in loudness associated with the remote signal audio level.

27 Claims, 7 Drawing Sheets

(56) References Cited

U.S. PATENT DOCUMENTS

| | | | |
|---|---|---|---|
| 2007/0127737 A1* | 6/2007 | Lee | H03G 3/32 |
| | | | 381/94.3 |
| 2010/0260362 A1 | 10/2010 | Sander et al. | |
| 2013/0188456 A1* | 7/2013 | Adcock | G01S 5/18 |
| | | | 367/127 |
| 2017/0048615 A1* | 2/2017 | Son | H03G 3/3005 |
| 2017/0061953 A1* | 3/2017 | An | G06F 1/163 |
| 2019/0103126 A1* | 4/2019 | Shim | H04M 1/6008 |
| 2019/0267009 A1* | 8/2019 | Zwart | G10L 17/06 |

\* cited by examiner

METHODS AND APPARATUS FOR LOW AUDIO FALLBACK FROM REMOTE DEVICES USING ASSOCIATED DEVICE SPEAKER

BACKGROUND OF THE INVENTION

Feature rich electronic devices, including portable communication devices, have evolved from simple analog devices to multifunction computing systems with different devices that may each have a speaker and a microphone. The system may include a portable communication device and a remote device. During a communication, the speaker of a remote device typically is configured as the speaker of the system for playing audio output and the microphone of the remote device typically is configured as the microphone of the system for capturing audio input.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems, methods, apparatus, and non-transitory, computer-readable storage media for configuring a portable communication device for low audio fallback.

In one embodiment, a disclosed portable communication device may include an audio communication interface configured to send and receive audio with a remote audio device, a speaker configured to output sound, and a processor. The processor may be configured to receive an incoming audio signal, adjust an audio level of the incoming audio signal that is received based on a setting of a volume control, mix the incoming audio signal having the adjusted audio level with an ultrasonic audio signal to generate a mixed audio signal, output the mixed audio signal to the remote audio device using the audio communication interface, receive a remote audio signal from the remote audio device using the audio communication interface, and compare an audio level of the remote audio signal to one or more thresholds to determine whether to output a compensated audio signal to the speaker. The ultrasonic audio signal may have an audio level independent of the setting of the volume control. The remote audio signal may be detected by the remote audio device in response to sound output from the remote audio device based on the mixed audio signal. The compensated audio signal may have an audio level adjusted based on an estimated loss in loudness associated with the audio level of the remote audio signal.

In one embodiment, a disclosed method for configuring a portable communication device may include receiving an incoming audio signal, adjusting an audio level of the incoming audio signal that is received based on a setting of a volume control, generating an ultrasonic audio signal, mixing the incoming audio signal having the adjusted audio level with the ultrasonic audio signal to generate a mixed audio signal, outputting the mixed audio signal to the remote audio device, receiving a remote audio signal from the remote audio device, and comparing an audio level of the remote audio signal to one or more thresholds to determine whether to output a compensated audio signal to a speaker. The ultrasonic audio signal may have an audio level independent of the setting of the volume control. The remote audio signal may be detected by the remote audio device in response to sound output from the remote audio device based on the mixed audio signal. The compensated audio signal may have an audio level adjusted based on an estimated loss in loudness associated with the audio level of the remote audio signal.

In one embodiment, a disclosed non-transitory, computer-readable storage medium may have program instructions stored thereon that when executed by an electronic processor cause the electronic processor to perform receiving an incoming audio signal, adjusting an audio level of the incoming audio signal that is received based on a setting of a volume control, generating an ultrasonic audio signal, mixing the incoming audio signal having the adjusted audio level with the ultrasonic audio signal to generate a mixed audio signal, outputting the mixed audio signal, receiving a remote audio signal output from the remote audio device, and comparing an audio level of the remote audio signal to one or more thresholds to determine whether to output a compensated audio signal to a speaker. The ultrasonic audio signal may have an audio level independent of the setting of the volume control. The remote audio signal may be detected by the remote audio device in response to sound output from the remote audio device based on the mixed audio signal. The compensated audio signal may have an audio level adjusted based on an estimated loss in loudness associated with the audio level of the remote audio signal.

In at least some embodiments of the present disclosure, the processor configured to compare the audio level of the remote audio signal to one or more thresholds may be further configured to determine whether a battery of the remote audio device has an acceptable level of charge based on the audio level of the remote audio signal being above a first threshold. The determination not to output the compensated audio signal may be based on the determination that the battery of the remote audio device has the acceptable level of a charge. Some embodiments of the present disclosure may include a portable communication device with a microphone configured to detect sound that is output by the remote audio device in which the processor is configured to compare the remote audio signal to an audio signal detected by the microphone to determine whether the remote audio device is defective and enable the microphone of the portable communication device to detect audio signals based on the determination that the remote audio device is defective.

Figure 1:
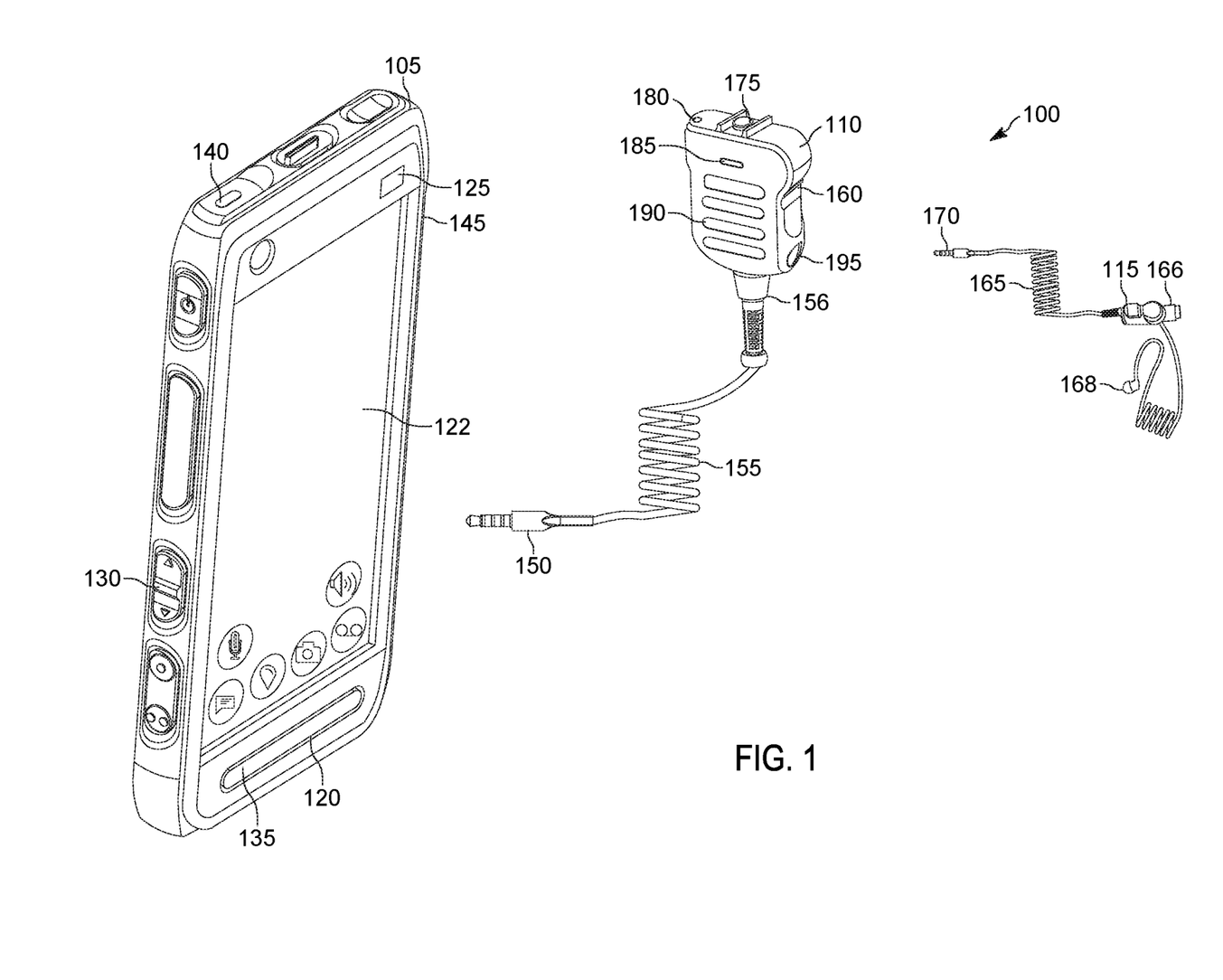
FIG. 1 is an illustration of an example electronic communication system with a portable communication device and a remote audio device, in accordance with some embodiments.

Referring now to FIG. 1, there is provided an illustration of one embodiment of an example electronic communication system 100, in accordance with some embodiments. In the illustrated example, electronic communication system 100 may include portable communication device 105, remote audio device 110, and secondary remote audio device 115. In public-safety or mission-critical environments, portable communication device 105 may be mounted near the waist of an individual. In certain public-safety or mission-critical environments that are loud, remote audio device 110 may be communicatively coupled to portable communication device 105 and mounted near the shoulder of an individual. In even louder environments, secondary remote audio device 115 may be mounted in or near at least one ear of an individual and communicatively coupled to one or more devices, such as portable communication device 105 and remote audio device 110.

Portable communication device 105 may support one or more types of communication, including but not limited to audio communication and data communication, using one or more types of transmission, including but not limited to a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the portable communication device 105 may support a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), an LTE Direct or LTE Device to Device, or a PTT over IP (PoIP) application may be implemented. Direct mode LTE standards may additionally or alternatively be implemented as well, including but not limited to the LTE Direct device-to-device standard. Portable communication device 105 may include speaker 120 to output sound and one or more microphones, such as microphones 125 and 135, to detect sound. Skilled artisans will appreciate that although one front-facing speaker and two front-facing microphones are shown, portable communication device 105 may include, in any suitable orientation, any suitable number of speakers to output sound and any suitable number of microphones to detect sound. For example, portable communication device 105 may include one or more speakers and one or more microphones oriented to be facing any variety of suitable directions, such as front-facing, rear-facing, top-facing, or bottom-facing.

Portable communication device 105 may include volume control 130 to adjust the volume of sound output from speaker 120. Volume control 130 may allow for one or more inputs to adjust the volume of sound output from speaker 120. For example, volume control 130 may include one button for increasing the volume and one button for decreasing the volume. Skilled artisans will appreciate that portable communication device 105 may include a microphone adjustment control to adjust the sensitivity of microphones 125 and 135 to detected sound. Volume control and microphone adjustment control may each be implemented as a physical control on the exterior of portable communication device 105 or as a virtual control displayed on screen 122 of portable communication device 105. Portable communication device 105 may provide be powered by a portable energy source, such as a battery, whose status may be provided by battery status indicator 140. Skilled artisans will appreciate that battery status indicator 140 may be implemented as a dedicated indicator visible from the exterior of portable communication device 105 or as a virtual indicator display on screen 122 of portable communication device 105.

Portable communication device 105 may be communicatively coupled to remote audio device 110 via an audio communication interface. The audio communication interface may be wired or wireless. For example, a wired audio communication interface may input and output audio signals via audio communication terminal 145, remote audio communication connector 150, remote audio communication cable 155, and remote audio communication terminal 156 to remote audio device 110. As another example, a wireless audio communication interface may use a Bluetooth protocol. In various embodiments, remote audio device 110 may be implemented as a remote speaker microphone (RSM) accessory to portable communication device 105. Remote audio device 110 may include a remote microphone 185 to detect sound and remote speaker 190 to output sound. Skilled artisans will appreciate that any number of speakers and any number of microphones may be included in remote audio device 110 in any suitable orientation and arrangement. In various embodiments, remote audio device 100 may include volume control 175, remote battery status indicator 180, and remote power port 195. Volume control 175 may be used to adjust the volume of sound output from remote speaker 190. Remote audio device 110 may be powered by one or more power sources, including but not limited to a battery in the housing of remote audio device 110, remote power port 195, and portable communication device via the audio communication interface, such as via audio communication terminal 145, remote audio communication connector 150, remote audio communication cable 155, and remote audio communication terminal 156. Remote battery status indicator 180 may provide the status of the power source for remote audio device 110.

Remote audio device 110 may be communicatively coupled to secondary remote audio device 115 via any suitable interface, including but not limited to a wired or wireless interface. For example, a wired interface may include secondary remote audio communication terminal 160, secondary remote audio communication connector 170, and secondary remote audio cable 165. Secondary remote audio device 115 may include a secondary microphone 166 and secondary speaker 168, which may provide additional sound output and sound detection. For example, when remote audio device 110 is communicatively coupled to secondary remote audio device 115, the audio input and output of remote audio device 110 may be disabled and the low audio fallback approach may be paused.

In various embodiments, portable communication device 105 may not receive indications from remote audio device 110 about the status of the remote audio device 110, which may indicate a fault with remote audio device 110, including but not limited to whether the wired interface to remote audio device 110 is damaged, whether one or more components of remote audio device 110 are damaged, such as remote microphone 185 or remote speaker 190, and whether the battery of remote audio device 110 is depleted. In public-safety or mission-critical environments, a user of the portable communication device 105 and remote audio device 110 may be unable to hear or be notified of incoming communications when one or more components associated with remote audio device 110 are damaged or the battery of remote audio device 110 is depleted. In various embodiments, the loudness, also known as intensity, of audio output from remote speaker 190 of remote audio device 110 may diminish as the battery of remote audio device 110 approaches depletion. When the battery of remote audio device 110 is depleted, remote speaker 190 may output audio at a diminished loudness or may stop output of audio. In various embodiments, portable communication device 105 may be configured to determine whether there is a fault associated with remote audio device 110. When a fault is detected, portable communication device 105 may enable an individual in public-safety or mission-critical environments to hear or be notified of incoming communications by falling back to use one or more components of portable communication device 105, including but not limited to outputting sound via speaker 120 and detecting sound via microphone 125 and 135.

Figure 2:
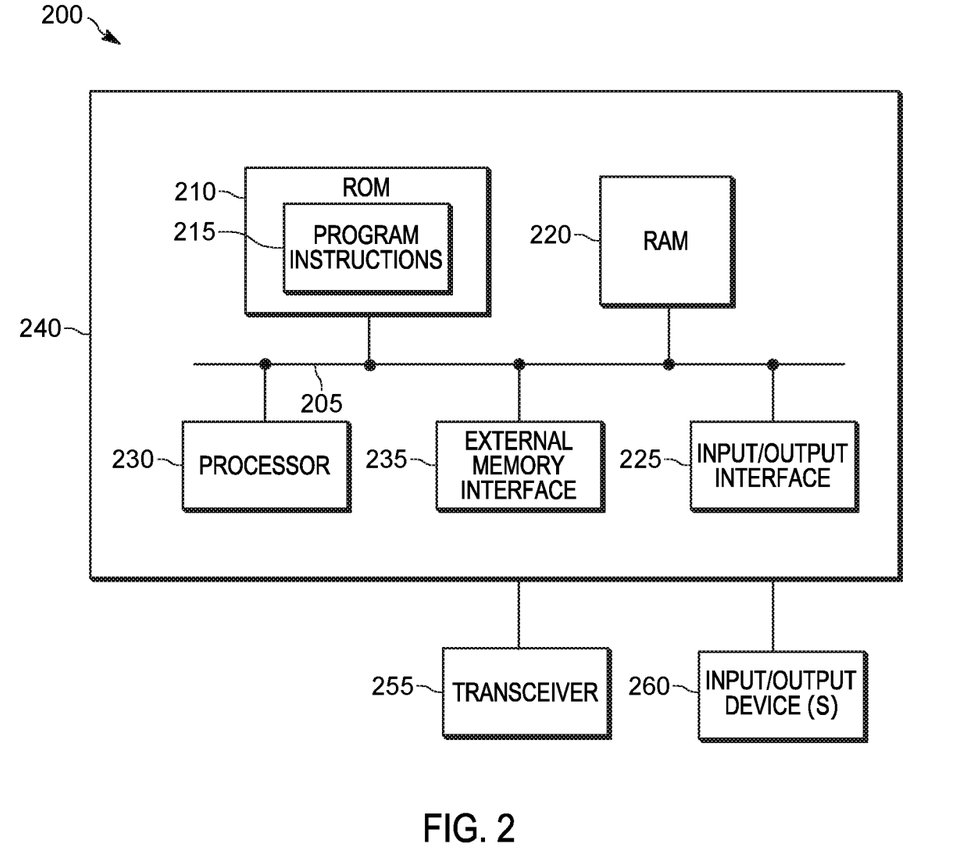
FIG. 2 is a block diagram illustrating selected elements of an example portable communication device including an application processing unit, in accordance with some embodiments.

Referring now to FIG. 2, there is provided a block diagram illustrating selected elements of an example portable communications device 200 including an application processing unit 240, in accordance with some embodiments. In various embodiments, portable communications device 200 may be a multifunction radio, a mobile telephone, a laptop computer, a tablet computer, a smart phone, or another type of electronic communication device.

As illustrated in this example embodiment, application processing unit 240 may include a Read Only Memory (ROM) 210, a Random Access Memory (RAM) 220, an electronic processor 230, an input/output interface 225, and an external memory interface 235, all of which are coupled to a system bus 205 through which they communicate with each other. In various embodiments, electronic processor 230 may include a microprocessor, a microcontroller, a system-on-chip, a field-programmable gate array, a programmable mixed-signal array, or, in general, any system or sub-system that includes nominal memory and that is capable of executing a sequence of instructions in order to control hardware elements of portable communications device 200.

In this example embodiment, ROM 210 stores program instructions 215, at least some of which may be executed by electronic processor 230 to perform the methods described herein. For example, at least some of the operations of method 400 illustrated in FIG. 4, operations of method 500 illustrated in FIG. 5, operations of method 600 illustrated in FIG. 6A, or operations of method 650 illustrated in FIG. 6B may be performed by program instructions executing on application processing unit 240. In some embodiments, program instructions 215 may include program instructions that when executed on application processing unit 240 implement other functionality features of portable communications device 200. In some embodiments, program instructions 215 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. RAM 220 may, from time to time, store data representing inputs to one or more methods illustrated in FIG. 4, FIG. 5, FIG. 6A, and FIG. 6B, such as data received from one or more of input/output device 260 through input/output interface 225. RAM 220 may also store data used in performing other functions of the portable communications device 200.

In this example embodiment, input/output interface 225 may include one or more analog input interfaces, such as one or more A/D converters, or digital interfaces for receiving signals or data usable in performing the methods described herein. For example, input/output interface 225 may include interfaces through which application processing unit 240 may be coupled to other elements portable communications device 200. In the illustrated example, application processing unit 240 is shown coupled to a transceiver 255 and one or more input/output devices 260. Transceiver 255 may, at various times, receive audio communications for playback over a speaker, such as speaker 120, or transmit audio captured using one or more microphones, such as microphones 125 and 135. One or more components of application processing unit 240, such as processor 230, may receive an incoming audio signal from transceiver 255. In various embodiments, transceiver 255 may be or include a land mobile radio (LMR) transceiver, a long term evolution (LTE) transceiver, a WiFi transceiver, or another type of audio transceiver. In some embodiments, application processing unit 240 may be coupled to input/output devices 260 that implement one or more of a microphone, or a speaker, such as those illustrated in FIG. 1 and described above. Any or all of these input/output devices 260 may be configured to send data to or receive data from application processing unit 240 over one or more data lines through input/output interface 225, in various embodiments. Similarly, any or all of these input/output devices 260 may be configured to assert or receive a control signal from application processing unit 240 over one or more connections through input/output interface 225. In response to receiving various inputs from input/output devices 260, the processor 230 may execute program instructions to determine how, when, and whether to configure one or more components of portable communications device 200, including but not limited to one or more microphones and one or more speakers, based on the status of a remote audio device.

In some embodiments, application processing unit 240 may be coupled to input/output devices 260 that implement other functionality features of portable communications device 200, such as a keyboard, a mouse, a touch panel, a switch, an additional microphone, a video camera, a display, an additional speaker, an infrared sensor, one or more other sensors, and the like over input/output interface 225.

External memory interface 235 may include one or more interfaces through which application processing unit 240 may be coupled to an external memory (not shown). Such an external memory may include, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 3:
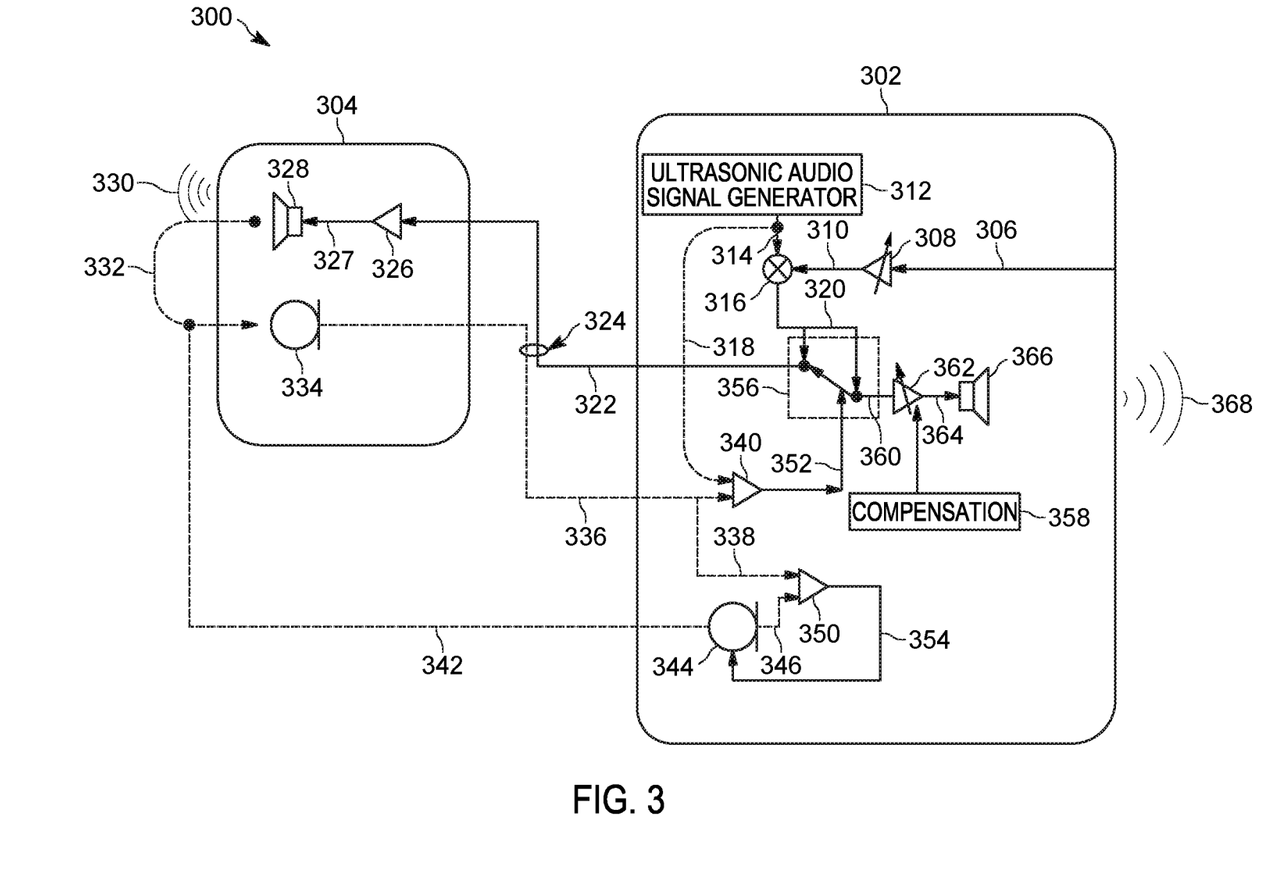
FIG. 3 is a block diagram illustrating selected elements of an example electronic communication system with a portable communication device and a remote audio device, in accordance with some embodiments.

Referring now to FIG. 3, there is provided a block diagram illustrating selected elements of an example electronic communication system 300, in accordance with some embodiments. Electronic communication system 300 may include portable communication device 302 and remote audio device 304. In various embodiments, portable communication device 302 may be implemented as portable communication device 200 as described for FIG. 2 with support for various functionality as described herein using program instructions executed by a processor. Portable communication device 302 may receive incoming audio signal 306, which may be an analog or digital audio signal. For example, an analog audio signal may be received by a transceiver, such as transceiver 255 as described for FIG. 2. The analog audio signal may be converted to a digital audio signal and processed by one or more components of portable communication device 302, including but not limited to an analog-to-digital converter (ADC) and digital signal processor (DSP). Incoming audio signal 306 may represent one or more communications, including but not limited to an incoming call and an alert notification tone.

The audio level of incoming audio signal 306 may be adjusted by volume control 308 for output by a speaker, such as local speaker 366 or remote speaker 328. Volume control 308 may amplify incoming audio signal 306 based on a volume control setting for portable communication device 302. In various embodiments, volume control 308 may be implemented using instructions executable by a processor of portable communication device 308. For example, volume control 130 as described for FIG. 1 may be used to adjust the audio level of incoming audio signal 306. Skilled artisans will appreciate that a plurality of settings may be used to adjust the audio level of a plurality of communications represented by incoming audio signal 306. For example, volume control 308 may include a separate setting for each communication represented by incoming audio signal 306. Volume control 308 may provide adjusted incoming audio signal 310 to mixer 316. Portable communication device 302 may include an ultrasonic audio signal generator 312 to provide an ultrasonic audio signal 314 with an audio level independent of volume control 308. In various embodiments, ultrasonic audio signal generator 312 may be implemented using program instructions executed by a processor. Those instructions, when executed, may provide a digital audio signal with ultrasonic audio information representing sound waves at a frequency above the upper limit of human hearing. For example, the ultrasonic audio signal may represent sound waves at or above 18 kHz. Mixer 316 may mix adjusted incoming audio signal 310 with ultrasonic audio signal 314 to generate mixed audio signal 320. Mixed audio signal 320 may be a digital audio signal with information representing adjusted incoming audio signal 310 and ultrasonic audio signal 314. Mixer 316 may be implementing using dedicated hardware, such as an audio mixer, or using program instructions executable by a processor.

Audio output of mixed audio signal 320 may be balanced between portable communication device 302 and remote audio device 304 using audio output switch 356 using remote speaker level adjustment signal 352 as described in more detail below. Audio output switch 356 may provide balanced output audio signal 322 to remote audio device 304. Skilled artisans will appreciate that balanced output audio signal 322 may be provided to remote audio device 304 as an analog or digital audio signal. Balanced output audio signal 322 may be received at remote audio communication connection 324 of remote audio device 304. In some embodiments, remote audio communication connection 324 may be implemented using an audio communication terminal, such as remote audio communication terminal 156 for remote audio device 110 as described for FIG. 1.

Balanced output audio signal 322 may be coupled to power amplifier (PA) 326 of remote audio device 304. Power amplifier 326 may output amplified mixed audio signal 327 to remote speaker 328 to output sound 330. Sound 330 may comprise audio corresponding to the incoming audio signal 306 and ultrasonic audio signal 314. In some embodiments, portable communication device 302 may drive remote speaker 328 of remote audio device 304 when the battery of remote audio device 304 is depleted for output sound 330 to be output. Microphone 334 of remote audio device may detect and be used to capture audio via path 332 that may represent a reproduction of ultrasonic audio signal 314. Microphone 334 may be located in proximity to remote speaker 328 to reduce detection of reflected sounds that are output by remote speaker 327 but reflected off one or more surfaces. Microphone 334 may provide remote audio signal 336 to remote audio communication connection 324.

Portable communication device 302 may receive remote audio signal 336, which may be input to remote speaker level comparator 340. Ultrasonic audio signal 314 may also be input to remote speaker level comparator 340 via 318. Remote speaker level comparator 340 may compare remote audio signal 336 to one or more of ultrasonic audio signal 314 and one or more thresholds. For example, the ultrasonic audio level of remote audio signal 336 may be compared to a first threshold. When the ultrasonic audio level of remote audio signal 336 is above a first threshold, it may be determined that remote audio device 304 has an acceptable level of charge in its battery. However, when the ultrasonic audio level of remote audio signal 336 is below the first threshold, the ultrasonic audio level of remote audio signal 336 may be compared to a second threshold. When the ultrasonic audio level of remote audio signal 336 is above a second threshold, it may be determined that remote audio device 304 has a depleted battery. However, when the ultrasonic audio level of remote audio signal 336 is below the second threshold, the ultrasonic audio level of remote audio signal 336 may be compared to a third threshold. The third threshold may correspond to no audio level for remote audio signal 336. When the ultrasonic audio level of remote audio signal 336 is equal to the third threshold, it may be determined that remote audio device 304 is damaged. Otherwise, it may be determined that the remote audio device 304 is coupled to a secondary remote audio device (not shown) and fallback in audio output from the remote audio device 304 to the portable communication device 302 may be disabled. One or more of the thresholds may be predefined or adjusted, such as by calibration or dynamic control. For example, the thresholds may be predefined based on a type of remote audio device. As another example, the thresholds may be adjusted based on dynamic control by an individual or an automated calibration routine.

In some embodiments, remote speaker level comparator 340 may perform high-pass filtering of remote audio signal 336 to isolate ultrasonic audio information. High-pass filtering of remote audio signal 336 by remote speaker level comparator 340 may be implemented using an audio high-pass filter or by using program instructions that perform high-pass filtering on a digital audio signal when executed by a processor (not shown) in portable communication device 302. Remote speaker level comparator 340 may perform a comparison between remote audio signal 336 and an ultrasonic audio signal via path 318. In various embodiments, the comparison may be performed by a hardware comparator, including but not limited to an op-amp based comparator and a CMOS-based comparator, or by using program instructions that perform comparison between digital audio signals when executed by a processor (not shown) of portable communication device 302. Remote speaker level comparator 340 may output remote speaker level adjustment signal 352 to control audio output switch 356 in any suitable manner. For example, audio output switch 356 may select either balanced output audio signal 322 or balanced local audio signal 360 based on output remote speaker level adjustment signal 352. As another example, audio output switch 356 may select either balanced output audio signal 322 or both balanced output audio signal 322 and balanced local audio signal 360 based on output remote speaker level adjustment signal 352. Output remote speaker level adjustment signal 352 may select balanced local audio signal 360 when it is determined that the battery of remote audio device 304 is depleted or remote audio device 304 is damaged.

When balanced local audio signal 360 is selected, outgoing volume control 362 may adjust balanced local audio signal 360 based on compensation value 358, which may represent the level of compensation to be applied to the incoming audio information in balanced local audio signal 360. For example, compensation value 358 may be calibrated based on the distance and orientation between one or more components of the remote audio device 304, including but not limited to remote speaker 328 and microphone 344 of the remote audio device 304, and one or more components of portable communication device 302, including but not limited to local speaker 366 and local microphone 344 of the portable communication device 302. As another example, compensation value 358 may be based on the estimated loss in loudness, which may be determined by a comparison between the ultrasonic audio signal 314 and the audio level of the remote audio signal 336. Outgoing volume control 362 may output compensated output audio signal 364 to local speaker 366 to output audio 368.

When microphone 344 of remote audio device 304 is defective, portable communication device 302 may detect the problem and fallback to local microphone 344. Remote ultrasonic audio 332 may be detected and captured using local microphone 344 of portable communications device 302 via path 342. Microphone 344 may be implemented using one or more microphones located on one or more sides of portable communications device 302 to provide local audio signal 346. Microphone comparator 350 may compare the ultrasonic audio level of remote audio signal 336 via 338 with the ultrasonic audio level of local audio signal 346. The comparison by microphone comparator 350 may be used to determine whether remote speaker 328 of remote audio device 304 or microphone 344 of remote audio device 304 is defective. For example, remote speaker 328 of remote audio device 304 may be defective when the ultrasonic audio level of remote audio signal 336 and the ultrasonic audio level of local audio signal 346 are substantially equal and may each be below a threshold. As another example, microphone 344 of remote audio device 304 may be defective when the ultrasonic audio level of remote audio signal 336 is below the ultrasonic audio level of local audio signal 346 by any suitable difference, including but not limited to a predefined difference based on the type of remote audio device 304 and a calibrated difference based on the distance between the remote audio device 304 and portable communication device 302 and the orientation of one or more components thereof. Microphone comparator 350 may be implemented using a hardware comparator, including but not limited to an op-amp based comparator and a CMOS-based comparator, or by program instructions that compare digital audio signals when executed by a processor portable communication device 302. When it is determined that microphone 344 of remote audio device 304 is defective, local microphone enable signal 354 may enable microphone 344 to detect and be used to capture audio for outgoing audio communications.

Figure 4:
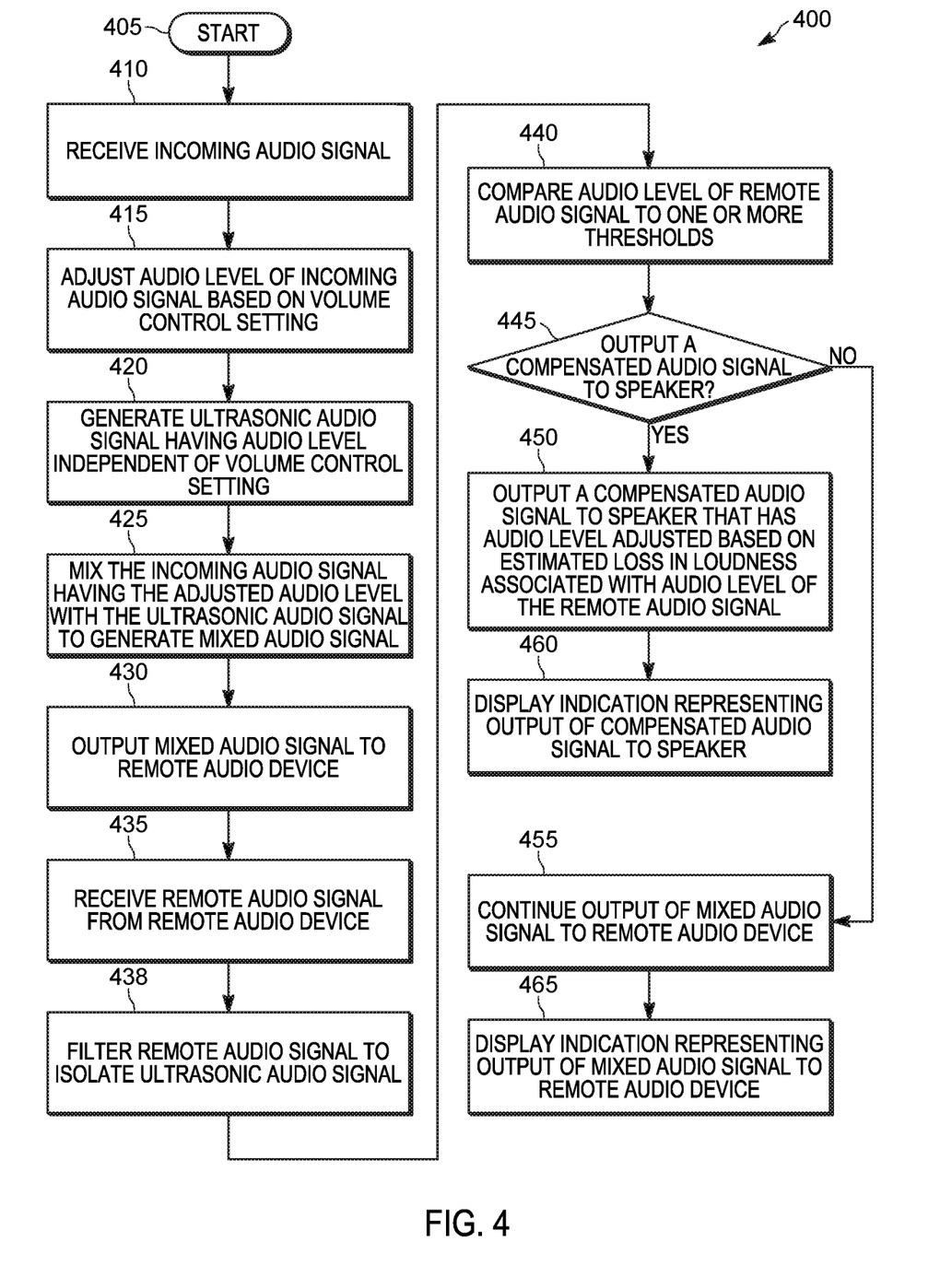
FIG. 4 is a flowchart illustrating selected elements of an example method for configuring a portable communication device for low audio fallback, in accordance with some embodiments.

Referring now to FIG. 4, there is provided a flowchart illustrating selected elements of an example method 400 for configuring a portable communication device for low audio fallback, in accordance with some embodiments. While a particular order of operations is indicated in FIG. 4 for illustrative purposes, the timing and ordering of such operations may vary where appropriate without negating the purpose and advantages of the examples set forth in detail throughout the remainder of this disclosure. For example, method 400 may operate periodically to configure a portable communication device for low audio fallback.

In this example embodiment, method 400 begins with block 405 in FIG. 4 and continues with block 410, where an incoming audio signal may be received. In some embodiments, the incoming audio signal may be an incoming push-to-talk call or other audio communication. The incoming audio signal may be received by a processor via any suitable path, such as via transceiver 255 which may be coupled to processor 230 in application processing unit 240 as described for FIG. 2. The incoming audio signal may represent communication in analog or digital form. In some embodiments, when the incoming audio signal represents communication in analog form, one or more analog-to-digital converters (ADCs) may be used to convert an analog audio signal to a digital form.

At block 415, the method may include adjusting the audio level of the incoming audio signal based on a volume control setting. Skilled artisans will appreciate that the volume control setting may represent one or more physical or virtual controls for the audio level. For example, a separate volume control may be provided for each communication represented by the incoming audio signal, including but not limited to communications corresponding to a push-to-talk call and an alert tone. In some embodiments, the volume control setting may adjust the audio level of the communication associated with the incoming audio signal without adjusting the audio level of other audio information embedded in the incoming audio signal, including but not limited to an alert tone embedded in the incoming audio signal. For example, volume control 130 of portable communication device 105 as described for FIG. 1 may adjust the audio level of the incoming audio signal. The audio level may be adjusted using any suitable technique, including but not limited to amplification, such as described for volume control 308 for FIG. 3.

At block 420, the method may include generating an ultrasonic audio signal. The ultrasonic audio signal may have an audio level independent of the volume control setting and may provide audio information at a constant audio level. The ultrasonic audio signal may represent audio in the frequency range above the audible range for human hearing, such as between 18 to 20 kHz. In various embodiments, the ultrasonic audio signal may be generated by program instructions when executed by a processor.

At block 425, the method may include mixing the incoming audio signal having the adjusted audio level with the ultrasonic audio signal to generate a mixed audio signal. The mixed audio signal may represent a plurality of communications, such as an incoming push-to-talk call, alert tone, and ultrasonic audio tone. Mixing may be preformed by a dedicated audio mixer or program instructions configured to mix audio when executed by a processor.

At block 430, the method may include outputting the mixed audio signal to a remote audio device. The remote audio device may receive the mixed audio signal and then output sound representing the mixed audio signal. For example, remote audio device 304 as described for FIG. 3 may receive an audio signal and output sound using remote speaker 328. Skilled artisans will appreciate that the remote audio device may perform active or passive amplification of the mixed audio signal. The sound output may be detected and captured using a microphone of the remote audio device, which in turn may output a remote audio signal to the portable communication device.

At block 435, the method may include receiving a remote audio signal from the remote audio device. The remote audio signal may be received via a wired connection, such as remote audio signal 336 as described for FIG. 3, or a wireless connection, such as a connection using a Bluetooth protocol.

At block 438, the method may include filtering the remote audio signal to isolate an ultrasonic audio signal within the remote audio signal. Filtering may be implemented as a high-pass filter using analog components, digital logic, or program instructions configured to perform filtering on digital audio when executed by a processor, such as processor 230 as described for FIG. 2. The high-pass filter may filter audio information below a predetermined frequency such that ultrasonic audio is isolated in the resulting remote audio signal.

Figure 5:
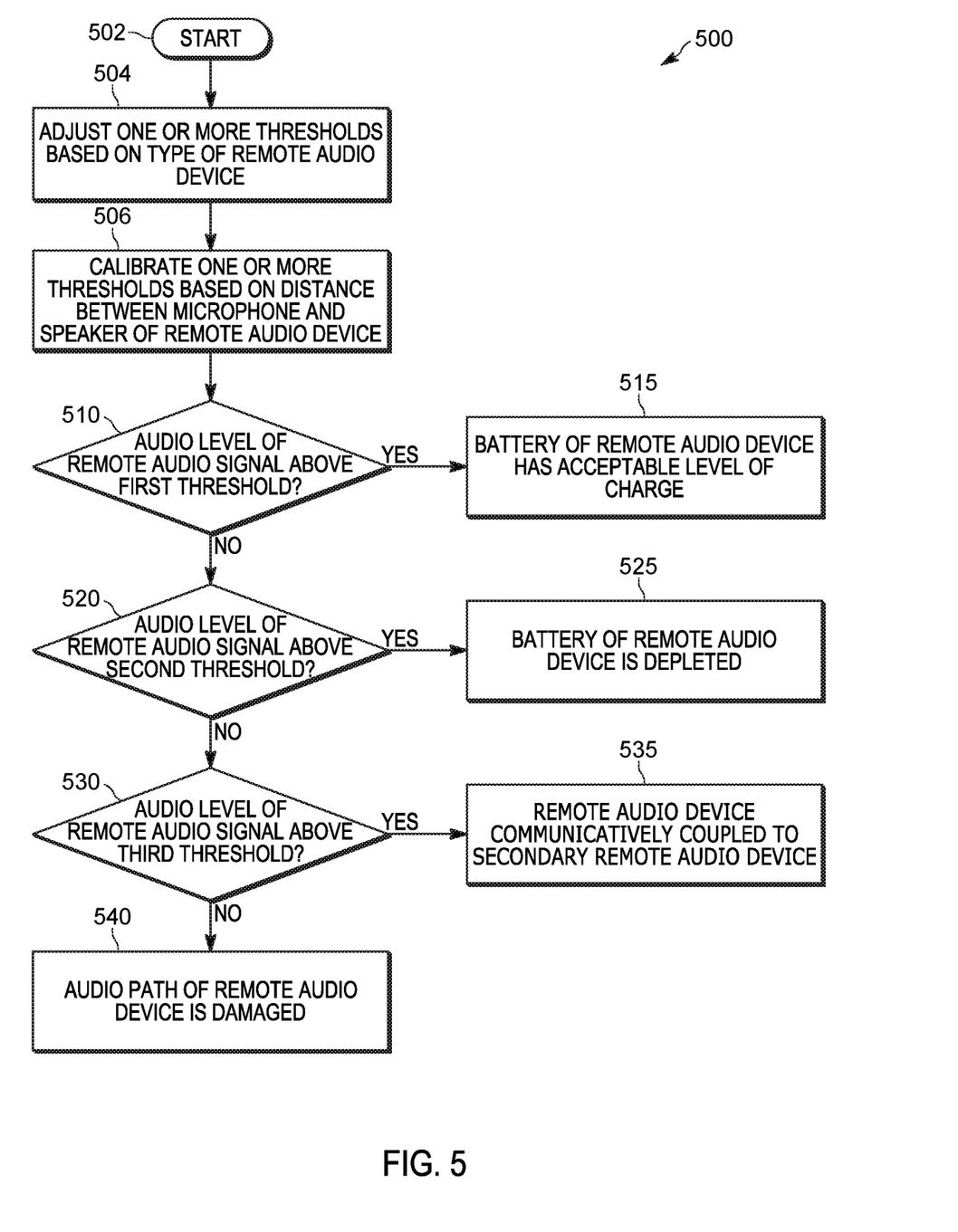
FIG. 5 is a flowchart illustrating selected elements of an example method for comparing the audio level of a remote audio signal with one or more thresholds, in accordance with some embodiments.

At block 440, the method may include comparing the audio level of the remote audio signal to one or more thresholds, such as described for method 500 in FIG. 5. In some embodiments, the thresholds and audio level may be compensated based on the ultrasonic audio tone. When the audio level is below one or more thresholds, it may be determined that the remote audio device cannot output or detect sound. One or more aspects of the remote audio device may inhibit its operation, including but not limited to a depleted battery of the remote audio device that does not have an acceptable level of charge and damage to the audio path of the remote audio device. In various embodiments, the remote audio device may be communicatively coupled to a secondary remote audio device, which may reduce the audio level of the remote audio signal. For example, the speaker of the secondary remote audio device may not sufficiently amplify audio signals representing ultrasonic audio. As another example, the microphone of the secondary remote audio device may not detect sound output by the speaker of the secondary remote audio device or the remote audio device. Accordingly, the audio level of the remote audio signal may be significantly inhibited by the microphone of the secondary remote audio device.

At block 445, the method may include determining whether to output a compensated audio signal to a speaker. The determination may be based on the comparison of the audio level of the remote audio signal to one or more thresholds. For example, when the audio level of the remote audio device is above the one or more thresholds, it may be determined that the battery of the remote audio device has an acceptable level of charge and that a compensated audio signal should not be output to the speaker. However, when the audio level of the remote audio signal is below one or more thresholds, it may be determined that the battery of the remote audio device is depleted and does not have an acceptable level of charge or that the audio path of the remote audio device is damaged, and that a compensated audio signal should be output to the speaker. As another example, when the audio level of the remote audio device is at an intermediate level, which may be between one or more thresholds, it may be determined that a secondary remote audio device is communicatively coupled to the remote audio device and that a compensated audio signal should not be output to the speaker. In some embodiments, when it is determined that a secondary remote audio device is communicatively coupled to the remote audio device, method 400 may be paused for a period to disable low audio fallback from a remote audio device.

When it is determined that a compensated audio signal should be output, method 400 may proceed to block 450 where a compensated audio signal may be output to the speaker. The compensated audio signal may have an audio level adjusted based on the estimated loss in loudness and the effective distance between the portable communication device and remote audio device. In various embodiments, the effective distance may be based on the actual distance and orientation between the portable communication device and remote audio device. In various embodiments, the estimated loss in loudness may be associated with the audio level of the remote audio signal and determined based on a comparison between the audio level of the remote audio signal and the ultrasonic audio signal that is generated. For example, compensation value 358 as described for FIG. 3 may provide an indication of the estimated loss in loudness to outgoing volume control 362, which may output compensated output audio signal 364 to local speaker 366.

At block 460, the method may include displaying an indication representing that the compensated audio signal is output to the speaker. The display may be implemented using a physical indicator, such as a light emitting diode (LED), or a virtual indicator, such as an icon on a display, such as display 122 of portable communication device 105 as described for FIG. 1.

When it is determined that a compensation audio should not be output, method 400 may proceed to block 455 where a mixed output signal may continue to be output to the remote audio device. At block 465, the method may include displaying an indication representing that the compensated audio signal is not output to the speaker. In various embodiments, the display may be implemented using a physical or virtual indicator.

Referring now to FIG. 5, there is provided a flowchart illustrating selected elements of an example method 500 for comparing the audio level of a remote audio signal with one or more thresholds, in accordance with some embodiments. While a particular order of operations is indicated in FIG. 5 for illustrative purposes, the timing and ordering of such operations may vary where appropriate without negating the purpose and advantages of the examples set forth in detail throughout the remainder of this disclosure.

In this example embodiment, method 500 begins with block 502 in FIG. 5 and continues with block 504, where one or more thresholds may be adjusted based on the type of remote audio device. Different types of remote audio devices may output sound with a speaker and detect sound with a microphone resulting in a remote audio signal with varying characteristics, including but not limited to the loudness of the audio represented by the remote audio signal and the frequency response of the audio represented by the remote audio signal. These characteristics may be predetermined based on one or more parameters of different types of remote audio device, including but not limited to specifications of the remote audio device and device characterization of the remote audio device. The type of remote audio device may be defined in any suitable manner, including but not limited to predefining the type of remote audio device, specifying the type of remote audio device by user input, and selecting the type of remote audio device based on an identification of the remote audio device. Skilled artisans will appreciate that adjustments may be made to one or more thresholds or the remote audio signal to provide adjustment based on the type of remote audio device.

At block 506, the method may include calibrating one or more thresholds based on the distance between the microphone and speaker of the remote audio device. The sound detected by the microphone may vary based on the distance and orientation between the speaker and the microphone of the remote audio device. A calibration tone may be output by the speaker and detected by the microphone to define the amount of calibration to apply to the one or more thresholds. Skilled artisans will appreciate that calibration information may be applied to one or more thresholds or the remote audio signal to compensate for the distance and orientation between the speaker and the microphone of the remote audio device.

At block 510, the method may include determining whether the audio level of the remote audio signal is above a first threshold. The comparison between the audio level of the remote audio signal and one or more thresholds may be performed using a hardware comparator to compare analog audio signals or a processor configured to execute program instructions to compare digital audio signals. When the audio level of the remote audio signal is above the first threshold, it may be determined that the battery of the remote audio device has an acceptable level of charge at block 515. When the audio level of the remote audio signal is below the first threshold, it may be determined that one or more problems with the remote audio device result in a lower loudness of audio output from the remote audio device.

At block 520, the method may include determining whether the audio level of the remote audio signal is above a second threshold. The second threshold may be less than the first threshold. When the audio level of the remote audio signal is above the second threshold and below the first threshold, it may be determined that the battery of the remote audio device is depleted without an acceptable level of charge at block 525. When the audio level of the remote audio signal is below the first and second thresholds, it may be determined that a secondary remote audio device is communicatively coupled to the remote audio device or that an audio path of the remote audio device is damaged.

At block 530, the method may include determining whether the audio level of the remote audio signal is above a third threshold. The third threshold may be less than the first and second thresholds. In some embodiments, the third threshold may correspond to the lack of an audio level in the remote audio signal. When the audio level of the remote audio signal is above the third threshold and below the first and second thresholds, it may be determined that the remote audio device is communicatively coupled to a secondary remote audio device at block 535. The communicative coupling of the secondary remote audio device may prevent the detection of low audio fallback. When the audio of the remote audio signal is below the first, second, and third thresholds, it may be determined that an audio path of the remote audio device is damaged at 540. When the audio path of the remote audio device is damaged, audio output may fall back to the portable communication device.

Figure 6A:
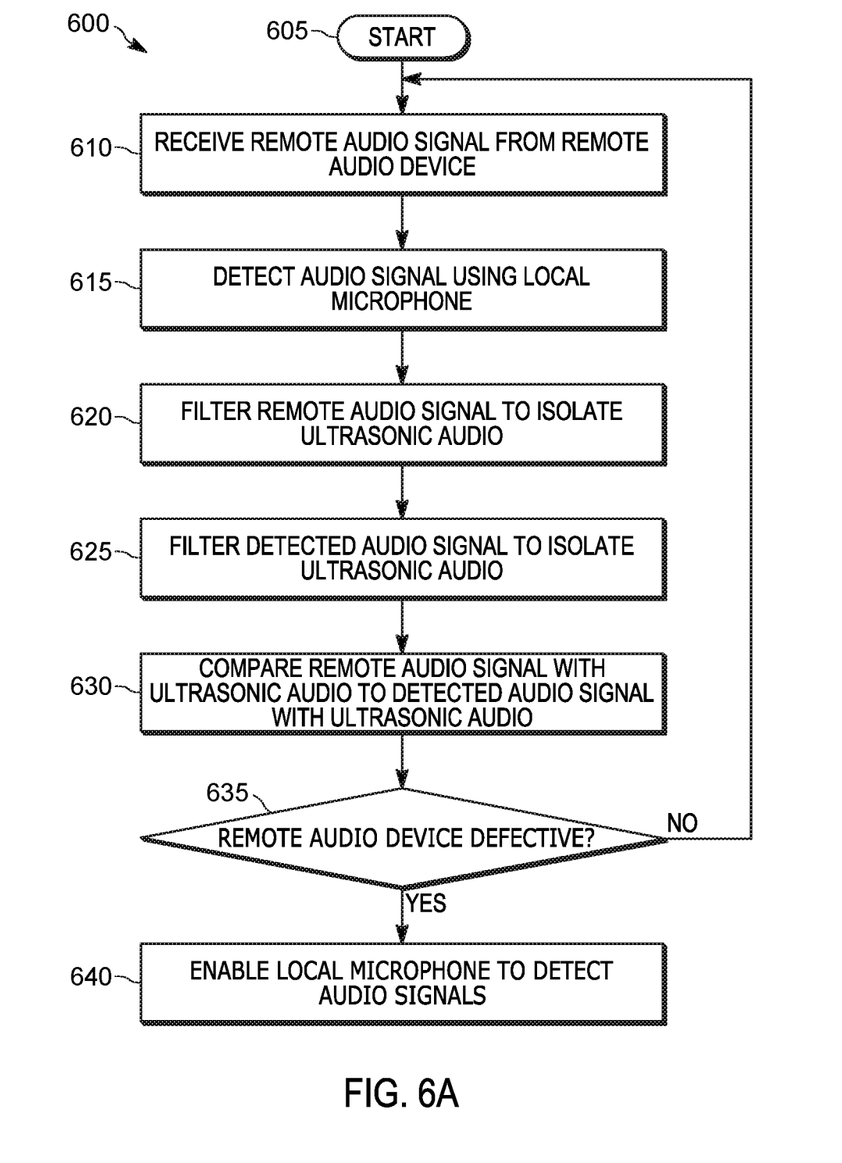
FIG. 6A is a flowchart illustrating selected elements of an example method for remote audio device defect determination, in accordance with some embodiments.

Referring now to FIG. 6A, there is provided a flowchart illustrating selected elements of an example method 600 for remote audio device defect determination, in accordance with some embodiments. While a particular order of operations is indicated in FIG. 6A for illustrative purposes, the timing and ordering of such operations may vary where appropriate without negating the purpose and advantages of the examples set forth in detail throughout the remainder of this disclosure.

In this example embodiment, method 600 begins with block 605 in FIG. 6A and continues with block 610, where a remote audio signal may be received from a remote audio device. The remote audio signal may be an analog or digital audio signal, such remote audio signal 336 as described for FIG. 3.

At block 615, the method may include detecting an audio signal using a local microphone. The audio signal may correspond to the sound output by the remote audio device. For example, microphone 125 or 135 of portable communication device 105 as described for FIG. 1 may detect an audio signal corresponding to sound output by remote speaker 190 of remote audio device 110. As another example, microphone 344 of portable communication device 302 as described for FIG. 3 may detect an audio signal via path 342. In various embodiments, detection of the audio signal may include conversion of sound waves that are received to an electronic representation of the sound waves, such as a digital or analog audio signal.

At block 620, the method may include filtering the remote audio signal to isolate ultrasonic audio. Filtering may be implemented as a high-pass filter using analog components, digital logic, or program instructions configured to perform filtering on digital audio when executed by a processor, such as processor 230 as described for FIG. 2. The high-pass filter may filter audio information below a predetermined frequency such that ultrasonic audio is isolated in the resulting remote audio signal.

At block 625, the method may include filtering the detected audio signal to isolate ultrasonic audio. Filtering of the detect audio signal may be performed in a similar manner to the filtering for the remote audio signal. In some embodiments, the analog components or program instructions may be shared, at least in part, between the filtering of the detected audio signal and remote audio signal.

At block 630, the method may include comparing the remote audio signal that is filtered for ultrasonic audio with the detected audio signal that is filtered for ultrasonic audio. The comparison between the remote audio signal and detected audio signal may evaluate the audio levels of the ultrasonic audio in each of the audio signals. For example, microphone comparator 350 as described for FIG. 3 may compare the ultrasonic audio level of local audio signal 346 with the ultrasonic audio level of remote audio signal 336. The comparison may be performed using a hardware comparator to compare analog audio signals or a processor configured to execute program instructions to compare digital audio signals.

At block 635, the method may include determining whether the remote audio device is defective based on the comparison between the remote audio signal and detected audio signal. The remote audio device may be determined to be defective when the audio level associated with the remote audio signal is below a threshold corresponding to the audio level of the detected audio signal. In some embodiments, the threshold may be adjusted based on a type of remote audio device and may be calibrated based on the distance and orientation between the remote audio device and the portable communication device. For example, the threshold may be increased by the calibration information when the distance between remote audio device and portable communication device increases because the audio signal detected by the local microphone at block 615 may have a reduced audio level.

When it is determined that the remote audio device is not defective, method 600 may proceed to block 610. Otherwise, at block 640, a local microphone may be enabled to detect audio signals. The fallback from the audio detection of the remote audio device may enable the portable communication device to continue communications when one or more components of the remote audio device, such as the microphone of the remote audio device, are defective.

Figure 6B:
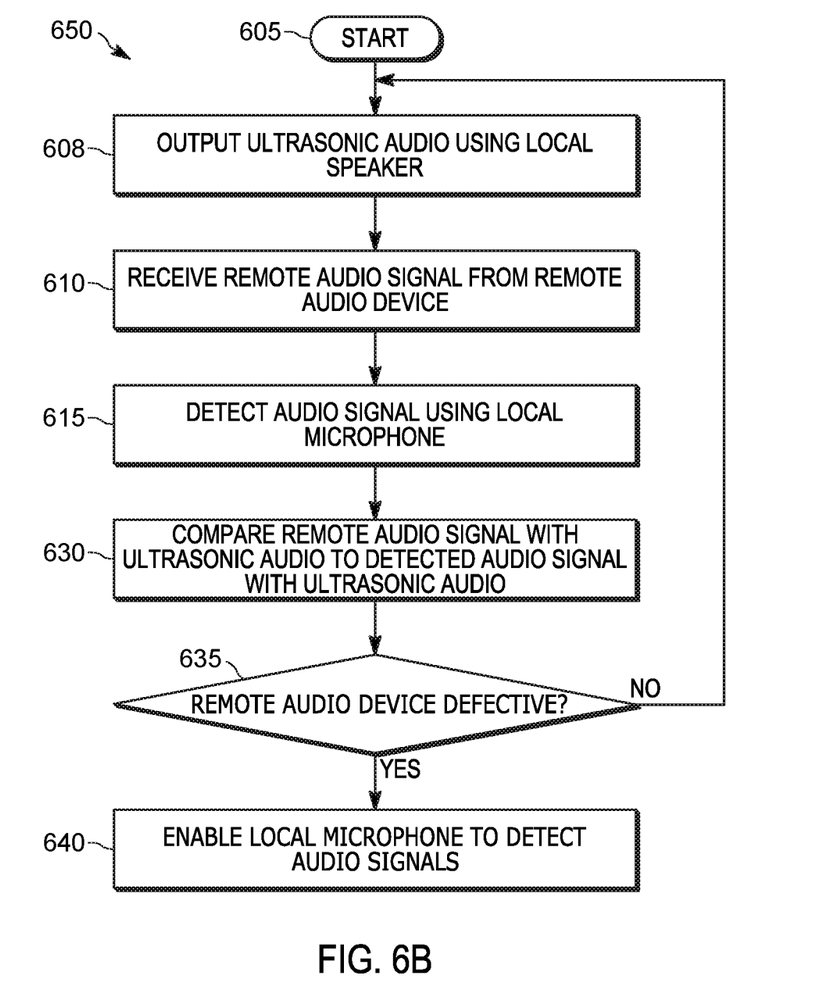
FIG. 6B is a flowchart illustrating selected elements of an example method for remote audio device defect determination using ultrasonic audio output, in accordance with some embodiments.

Referring now to FIG. 6B, there is provided a flowchart illustrating selected elements of an example method 650 for remote audio device defect determination using ultrasonic audio output, in accordance with some embodiments. While a particular order of operations is indicated in FIG. 6B for illustrative purposes, the timing and ordering of such operations may vary where appropriate without negating the purpose and advantages of the examples set forth in detail throughout the remainder of this disclosure.

In this example embodiment, method 650 begins with block 605 in FIG. 6B and continues with block 608, where ultrasonic audio is output using a local speaker. For example, local speaker 366 as described for FIG. 3 may output ultrasonic audio based on the ultrasonic audio signal 214.

At block 610, the method may include receiving a remote audio signal from a remote audio device, as the described for block 610 of FIG. 6A. At block 615, an audio signal may be detected using the local microphone. The audio signal may correspond to the ultrasonic audio output using the local speaker at block 608. For example, microphone 125 or 135 of portable communication device 105 as described for FIG. 1 may detect an audio signal corresponding to sound output by local speaker 120 of portable communication device 105.

At block 630, the method may include comparing the remote audio signal having ultrasonic audio with the detected audio signal having ultrasonic audio, such as described for block 630 of FIG. 6A.

At block 635, the method may include determining whether the remote audio device is defective, such as described for block 635 of FIG. 6B. One or more components of the remote audio device may be defective, such as the speaker of the remote audio device.

When it is determined that the remote audio device is not defective, method 650 may continue to block 608. Otherwise, at block 640, a local microphone may be enabled to detect audio signals. In some embodiments, the local speaker may also be enabled to output sound. The fallback from the audio detection of the remote audio device may enable the portable communication device to continue communications when one or more components of the remote audio device, such as the speaker of the remote audio device, are defective.

In at least some embodiments, the systems, methods, and apparatus described herein for configuring a portable communication device for low audio fallback may provide technical benefits when compared to existing techniques for audio communications. The described techniques use ultrasonic audio, without user intervention, to determine whether an existing remote audio device, without any modification to the remote audio device, has one or more problems, including but not limited to a depleted battery, damaged audio path, defective remote speaker, and defect remote microphone. The described techniques include detecting when a secondary audio device is being used for audio communications to avoid false activations of low audio fallback. The determination whether an existing remote audio device has a problem includes an approach to mix an ultrasonic audio tone with an incoming audio signal, communicate the mixed audio signal to the remote audio device, receiving a remote audio signal from the remote audio device that represents the ultrasonic audio tone, and comparing the audio level of the remote audio signal that is associated with the ultrasonic audio tone to one or more thresholds. This approach provides for adjustments to the portable communication device's speaker volume to compensate for the loss in audio playback loudness from the remote audio device. Systems without low audio fallback require user invention, without any notification to the user, to replace or disable remote audio devices with one or more problems. For example, some types of remote audio devices may stop audio output when the battery of the device is depleted and thus a user may not be able to notice the problem or distinguish a depleted battery from a pause in audio communications. Other systems may enable a user to disable communications via remote audio devices, but may require user intervention to determine the appropriate loudness of the local speaker. By comparing the signal level of the generated ultrasonic audio tone to the remote audio signal detected at the remote audio device, the described techniques may dynamically adjust the loudness of the local speaker.

In addition, unlike some existing approaches, the techniques described herein do not require modifications to the hardware of the portable communication device or remote audio device. Instead, the techniques described herein may use existing radio capabilities without any hardware changes.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus the following claims are hereby incorporated into the Detailed Description, with each claim standing on its own as a separately claimed subject matter.

We claim:

1. A portable communication device, comprising:
   an audio communication interface configured to send and receive audio with a remote audio device;
   a speaker configured to output sound; and
   a processor configured to:
      receive an incoming audio signal;
      adjust an audio level of the incoming audio signal that is received based on a setting of a volume control;
      mix the incoming audio signal having the adjusted audio level with an ultrasonic audio signal to generate a mixed audio signal, the ultrasonic audio signal having an audio level independent of the setting of the volume control;
      output the mixed audio signal to the remote audio device using the audio communication interface;
      receive a remote audio signal from the remote audio device using the audio communication interface, the remote audio signal detected by the remote audio device in response to sound output from the remote audio device based on the mixed audio signal;
      compare an audio level of the remote audio signal to one or more thresholds to determine whether to output a compensated audio signal to the speaker, the compensated audio signal having an audio level adjusted based on an estimated loss in loudness associated with the audio level of the remote audio signal.

2. The portable communication device of claim 1, wherein the processor configured to compare the audio level of the remote audio signal to the one or more thresholds is further configured to:
   determine whether a battery of the remote audio device has an acceptable level of charge based on the audio level of the remote audio signal being above a first threshold, wherein the determination not to output the compensated audio signal is based on the determination that the battery of the remote audio device has the acceptable level of a charge.

3. The portable communication device of claim 2, wherein the processor configured to compare the audio level of the remote audio signal to the one or more thresholds is further configured to:
   determine whether a battery of the remote audio device is depleted based on the audio level of the remote audio signal being below the first threshold and above a second threshold, wherein:
      the second threshold is less than the first threshold; and
      the determination to output the compensated audio signal is based on the determination that the battery of the remote audio device is depleted.

4. The portable communication device of claim 3, wherein the processor configured to compare the audio level of the remote audio signal to the one or more thresholds is further configured to:

determine whether an audio path of the remote audio device is damaged based on the audio level of the remote audio signal being equal to a third threshold, wherein:
the third threshold corresponds to an absence of audio information in the remote audio signal and is less than the second threshold; and
the determination to output the compensated audio signal is based on the determination that the audio path of the remote audio device is damaged.

5. The portable communication device of claim 3, wherein the processor configured to compare the audio level of the remote audio signal to the one or more thresholds is further configured to:
determine whether the remote audio device is communicatively coupled to a secondary remote audio device based on the audio level of the remote audio signal being below the second threshold and above a third threshold, wherein:
the third threshold corresponds to an absence of audio information in the remote audio signal and is less than the second threshold; and
the determination not to output the compensated audio signal is based on the determination that the remote audio device is communicatively coupled to the secondary remote audio device.

6. The portable communication device of claim 1, wherein the incoming audio signal is converted to a digital audio signal before receipt by the processor.

7. The portable communication device of claim 1, wherein the processor is further configured to:
display an indication representing the determination whether to output the compensated audio signal to the speaker.

8. The portable communication device of claim 1, further comprising:
a microphone configured to detect sound output by the remote audio device, wherein the processor is further configured to:
compare the remote audio signal to an audio signal detected by the microphone to determine whether the remote audio device is defective; and
enable the microphone to detect audio signals based on the determination that the remote audio device is defective.

9. The portable communication device of claim 1, further comprising:
a microphone configured to detect ultrasonic sound output by the speaker, wherein the processor is further configured to:
compare the remote audio signal to an audio signal detected by the microphone to determine whether the remote audio device is defective; and
enable the microphone of the portable communication device to detect audio signals based on the determination that the remote audio device is defective.

10. The portable communication device of claim 1, wherein:
the remote audio signal received from the remote audio device is filtered to isolate ultrasonic audio in the remote audio signal; and
the processor is configured to compare the audio level of the remote audio signal to the one or more thresholds by use of the isolated ultrasonic audio signal.

11. The portable communication device of claim 1, wherein the audio communication interface uses a 3.5 mm jack.

12. The portable communication device of claim 1, wherein the incoming audio signal is a push-to-talk call.

13. The portable communication device of claim 1, further comprising:
a microphone configured to detect sound output by the remote audio device, wherein processor is further configured to:
calibrate at least one of the one or more thresholds based on a distance between the microphone and the remote audio device.

14. The portable communication device of claim 1, wherein the processor is further configured to:
adjust at least one of the one or more thresholds based on a type of the remote audio device.

15. A method for configuring a portable communication device, comprising:
receiving an incoming audio signal;
adjusting an audio level of the incoming audio signal that is received based on a setting of a volume control;
generating an ultrasonic audio signal, the ultrasonic audio signal having an audio level independent of the setting of the volume control;
mixing the incoming audio signal having the adjusted audio level with the ultrasonic audio signal to generate a mixed audio signal;
outputting the mixed audio signal to a remote audio device;
receiving a remote audio signal from the remote audio device, the remote audio signal detected by the remote audio device in response to sound output from the remote audio device based on the mixed audio signal;
comparing an audio level of the remote audio signal to one or more thresholds to determine whether to output a compensated audio signal to a speaker, the compensated audio signal having an audio level adjusted based on an estimated loss in loudness associated with the audio level of the remote audio signal.

16. The method of claim 15, wherein comparing the audio level of the remote audio signal to the one or more thresholds comprises:
determining whether a battery of the remote audio device has an acceptable level of charge based on the audio level of the remote audio signal being above a first threshold, wherein the determination not to output the compensated audio signal is based on the determination that the battery of the remote audio device has the acceptable level of a charge.

17. The method of claim 16, wherein comparing the audio level of the remote audio signal to the one or more thresholds comprises:
determining whether the battery of the remote audio device is depleted based on the audio level of the remote audio signal being below the first threshold and above a second threshold, wherein:
the second threshold is less than the first threshold; and
the determination to output the compensated audio signal is based on the determination that the battery of the remote audio device is depleted.

18. The method of claim 15, wherein the sound output from remote audio device is based on the mixed audio signal by passive amplification of the mixed audio signal output.

19. The method of claim 18, wherein comparing the audio level of the remote audio signal to the one or more thresholds comprises:

determining whether an audio path of the remote audio device is damaged based on the audio level of the remote audio signal being equal to a third threshold, wherein:
the third threshold corresponds to an absence of audio information in the remote audio signal and is less than the second threshold; and
the determination to output the compensated audio signal is based on the determination that the audio path of the remote audio device is damaged.

20. The method of claim 18, wherein comparing the audio level of the remote audio signal to the one or more thresholds comprises:
determining whether the remote audio device is communicatively coupled to a secondary remote audio device based on the audio level of the remote audio signal being below the second threshold and above a third threshold, wherein
the third threshold corresponds to an absence of audio information in the remote audio signal and is less than the second threshold; and
the determination not to output the compensated audio signal is based on the determination that the remote audio device is communicatively coupled to the secondary remote audio device.

21. The method of claim 15, further comprising:
displaying an indication that represents the determination whether to output a compensated audio signal to the speaker.

22. The method of claim 15, further comprising:
detecting with a microphone sound output by the remote audio device;
comparing the remote audio signal to an audio signal detected from the sound output by the remote audio device to determine whether the remote audio device is defective;
enabling the microphone to detect audio signals based on the determination that the remote audio device is defective.

23. The method of claim 15, further comprising:
detecting with a microphone ultrasonic sound output by the speaker;
comparing the remote audio signal to an audio signal detected from the ultrasonic sound output by the speaker to determine whether the remote audio device is defective;
enabling the microphone to detect audio signals based on the determination that the remote audio device is defective.

24. The method of claim 15, further comprising:
filtering the remote audio signal received from the remote audio device to isolate the ultrasonic audio signal, wherein the comparison of the audio level of the remote audio signal to the one or more thresholds uses the isolated ultrasonic audio signal.

25. The method of claim 15, wherein the incoming audio signal is a push-to-talk call.

26. The method of claim 15, further comprising:
detecting with a microphone sound output by the remote audio device; and
calibrating at least one of the one or more thresholds based on a distance between the microphone and the remote audio device.

27. The method of claim 15, further comprising:
adjusting at least one of the one or more thresholds based on a type of the remote audio device.

* * * * *